United States Patent
Xu et al.

(10) Patent No.: US 10,574,306 B2
(45) Date of Patent: *Feb. 25, 2020

(54) CODEBOOK AND FEEDBACK DESIGN FOR HIGH ORDER MIMO

(71) Applicant: QUALCOMM Incorporated, San Diego, CA (US)

(72) Inventors: Hao Xu, San Diego, CA (US); Stefan Geirhofer, Brooklyn, NY (US); Peter Gaal, San Diego, CA (US); Wanshi Chen, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,620

(22) Filed: Jul. 19, 2016

(65) Prior Publication Data

US 2016/0329939 A1 Nov. 10, 2016

Related U.S. Application Data

(63) Continuation of application No. 13/895,772, filed on May 16, 2013, now Pat. No. 9,397,738.
(Continued)

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0456* (2013.01); *H04L 5/0048* (2013.01); *H04B 7/0639* (2013.01)

(58) Field of Classification Search
CPC .. H04B 7/0417; H04B 7/0456; H04B 7/0639; H04L 5/0048
See application file for complete search history.

(56) References Cited

U.S. PATENT DOCUMENTS 9,397,738 B2 7/2016 Xu et al.
2008/0080641 A1 4/2008 Kim
(Continued)

FOREIGN PATENT DOCUMENTS

| EP | 1536658 A2 | 6/2005 |
|---|---|---|
| EP | 2161783 A1 | 3/2010 |
| WO | WO-2007024913 A1 | 3/2007 |

OTHER PUBLICATIONS

Alcatel-Lucent Shanghai Bell et al., "Considerations on CSI feedback enhancements for high-priority antenna configurations", 3GPP Draft; R1-112420 Considerations on CSI Feedback Enhancements for High-Priority Antenna Configurations Clean, 3rd Generation Partnership Project (3GPP), Mobile Competence Centre ; 650, Route Des Lucioles ; F-06921 Sophia-Antipolis Cedex, France, vol. Ran Wg1, No. Athens, Greece; Aug. 22, 2011, Aug. 18, 2011 (Aug. 18, 2011), XP050537814, [retrieved on Aug. 18, 2011].
(Continued)

*Primary Examiner* — Patrick N Edouard
*Assistant Examiner* — Eboni N Giles
(74) *Attorney, Agent, or Firm* — Patterson & Sheridan, LLP

(57) ABSTRACT

Aspects of the present disclosure relate to techniques that may be utilized in networks with base stations and/or mobile devices that use large number of antennas or multi-dimensional arrays of antennas.

16 Claims, 8 Drawing Sheets

Related U.S. Application Data

(60) Provisional application No. 61/648,468, filed on May 17, 2012.

(51) Int. Cl.
*H04L 5/00* (2006.01)
*H04B 7/06* (2006.01)

(56) References Cited

U.S. PATENT DOCUMENTS

| | | | |
|---|---|---|---|
| 2008/0192849 A1 | 8/2008 | Kim et al. | |
| 2008/0273452 A1 | 11/2008 | Khan et al. | |
| 2009/0041150 A1* | 2/2009 | Tsai | H04B 1/59 375/267 |
| 2010/0202559 A1 | 8/2010 | Luo et al. | |
| 2011/0268077 A1 | 11/2011 | Wan et al. | |
| 2012/0033630 A1* | 2/2012 | Chung | H04B 7/0473 370/329 |
| 2012/0058767 A1 | 3/2012 | Molnar et al. | |
| 2012/0113816 A1* | 5/2012 | Bhattad | H04L 5/0032 370/246 |
| 2012/0269283 A1* | 10/2012 | Erell | H04L 5/0023 375/267 |
| 2012/0288022 A1* | 11/2012 | Guey | H04B 7/0691 375/267 |
| 2013/0021991 A1* | 1/2013 | Ko | H04B 7/0413 370/329 |
| 2013/0114565 A1 | 5/2013 | Chen et al. | |
| 2013/0120191 A1* | 5/2013 | Zhang | H04B 7/0469 342/377 |
| 2013/0230081 A1* | 9/2013 | Wernersson | H04B 7/0617 375/219 |
| 2013/0242773 A1* | 9/2013 | Wernersson | H04B 7/024 370/252 |
| 2013/0258964 A1* | 10/2013 | Nam | H04W 72/046 370/329 |

OTHER PUBLICATIONS

International Search Report and Written Opinion—PCT/US2013/041518—ISA/EPO—dated Sep. 9, 2013.

Motorola: "LTE-A DL-MIMO Enhancements 8-Tx eNB and MU-MIMO Optimization", 3GPP Draft; R1-084406 D L-MIMO Enhancement (Motoro La), 3rd Generation Partnership Project (3GPP), Mobile Competence Centre., 650, Route Des Lucioles, F-06921, Sophia-Anti Polis Cedex, France, No. Prague, Czech Republic; Nov. 5, 2008, Nov. 5, 2008 (Nov. 5, 2008), XP050317668, [retrieved on Nov. 5, 2008].

Qualcomm Europe: "Views for DL MIMO Operation in LTE-A", 3GPP Draft; R1-090874, 3rd Generation Partnership Project (3GPP), Mobile Competence Centre; 650, Route Des Lucioles; F-06921 Sophia-Antipolis Cedex, France, No. Athens, Greece; Feb. 4, 2009, Feb. 4, 2009 (Feb. 4, 2009), XP050318723, [retrieved on Feb. 4, 2009].

* cited by examiner

CODEBOOK AND FEEDBACK DESIGN FOR HIGH ORDER MIMO

CROSS-REFERENCE TO RELATED APPLICATIONS

This application is a continuation of U.S. patent application Ser. No. 13/895,772 filed on May 16, 2013, entitled "Codebook and Feedback Design for High Order MIMO" which claims benefit of priority to U.S. Provisional Application No. 61/648,468, filed on May 17, 2012, and which are expressly incorporated by reference herein in their entirety.

TECHNICAL FIELD

Certain embodiments of the present disclosure generally relate to wireless communication and, more particularly, to techniques that may be utilized in wireless communication networks with base stations that use multi-dimensional arrays of antennas.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a base station with a multi-dimensional array of antennas. Such an array may be used to optimize transmissions, based on feedback from one or more user equipments (UEs) served by the base station. However, there are several challenges with such optimizations.

SUMMARY

Certain aspects of the present disclosure provide a method for wireless communications by a base station. The method generally includes mapping N physical antennas arranged in at least two dimensions to K virtual antennas, wherein K is less than N, transmitting reference signals (RS) via the K virtual antennas, and receiving, from a user equipment, feedback based on the RS transmitted on the K virtual antennas.

Certain aspects of the present disclosure provide a method for wireless communications by a user equipment (UE). The method generally includes receiving information regarding mapping of N physical antennas of a base station arranged in at least two dimensions to K virtual antennas, wherein K is less than N, receiving reference signals (RS) transmitted from the base station via the K virtual antennas, and transmitting, to the base station, feedback based on the RS.

Certain aspects of the present disclosure provide an apparatus for wireless communications by a base station. The apparatus generally includes means for mapping N physical antennas arranged in at least two dimensions to K virtual antennas, wherein K is less than N, means for transmitting reference signals (RS) via the K virtual antennas, and means for receiving, from a user equipment, feedback based on the RS transmitted on the K virtual antennas.

Certain aspects of the present disclosure provide an apparatus for wireless communications by a user equipment (UE). The apparatus generally includes means for receiving information regarding mapping of N physical antennas of a base station arranged in at least two dimensions to K virtual antennas, wherein K is less than N, means for receiving reference signals (RS) transmitted from the base station via the K virtual antennas, and means for transmitting, to the base station, feedback based on the RS.

Certain aspects of the present disclosure provide an apparatus for wireless communications by a base station. The apparatus generally includes at least one processor configured to map N physical antennas arranged in at least two dimensions to K virtual antennas, wherein K is less than N, transmit reference signals (RS) via the K virtual antennas, and receive, from a user equipment, feedback based on the RS transmitted on the K virtual antennas; and a memory coupled with the at least one processor.

Certain aspects of the present disclosure provide an apparatus for wireless communications by a user equipment (UE). The apparatus generally includes at least one processor configured to receive information regarding mapping of N physical antennas of a base station arranged in at least two dimensions to K virtual antennas, wherein K is less than N, receive reference signals (RS) transmitted from the base station via the K virtual antennas, and transmit, to the base station, feedback based on the RS.

Certain aspects of the present disclosure provide a program product for wireless communications by a base station comprising a computer readable medium having instructions stored thereon. The instructions generally includes instructions for mapping N physical antennas arranged in at least two dimensions to K virtual antennas, wherein K is less than N, transmitting reference signals (RS) via the K virtual antennas, and receiving, from a user equipment, feedback based on the RS transmitted on the K virtual antennas.

Certain aspects of the present disclosure provide a program product for wireless communications by a user equipment comprising a computer readable medium having instructions stored thereon. The instructions generally includes instructions for receiving information regarding mapping of N physical antennas of a base station arranged in at least two dimensions to K virtual antennas, wherein K is less than N, receiving reference signals (RS) transmitted from the base station via the K virtual antennas, and transmitting, to the base station, feedback based on the RS.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
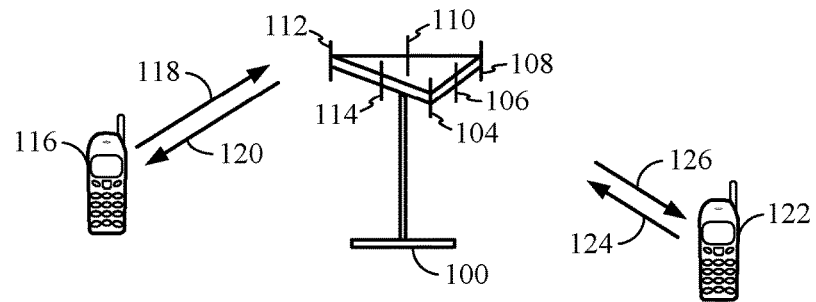
FIG. 1 illustrates a multiple access wireless communication system, according to aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
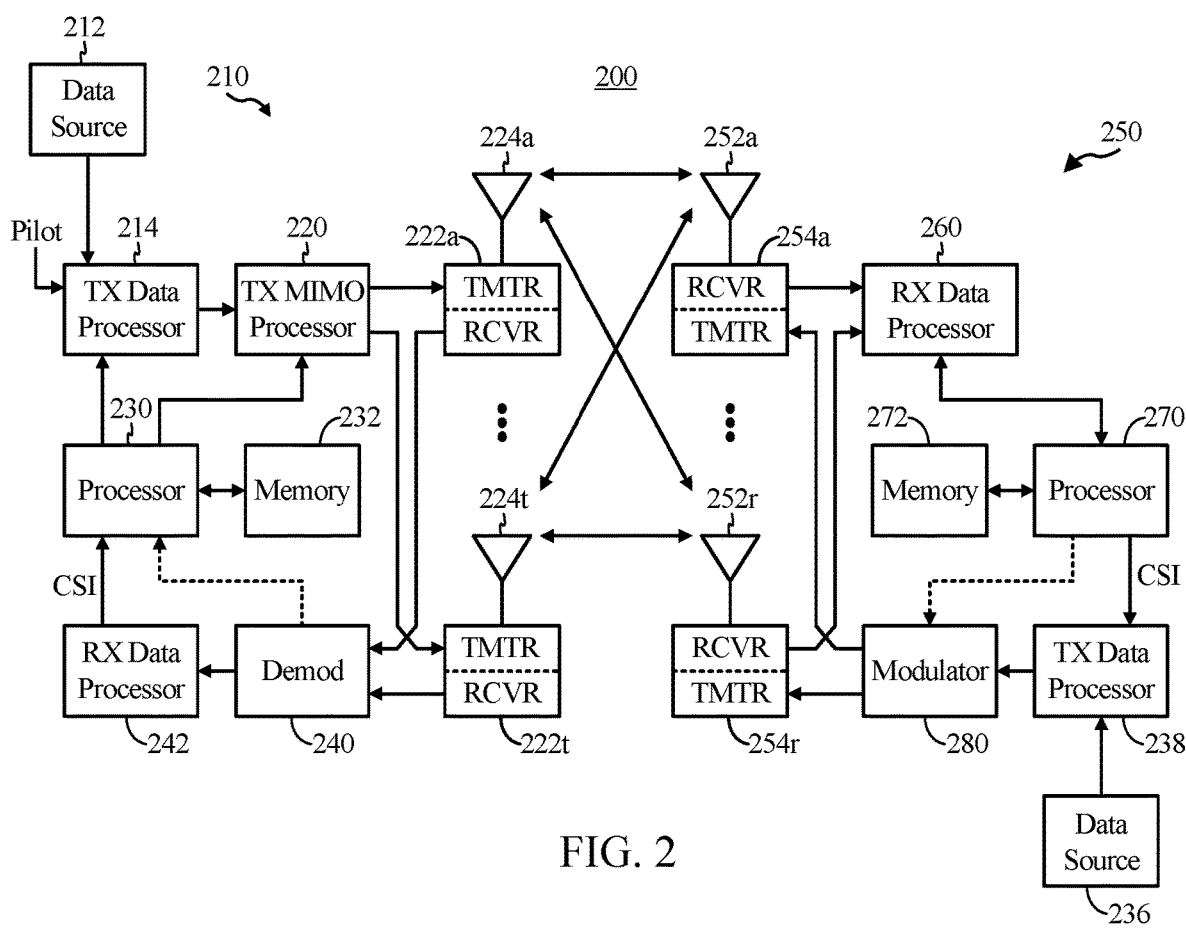
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
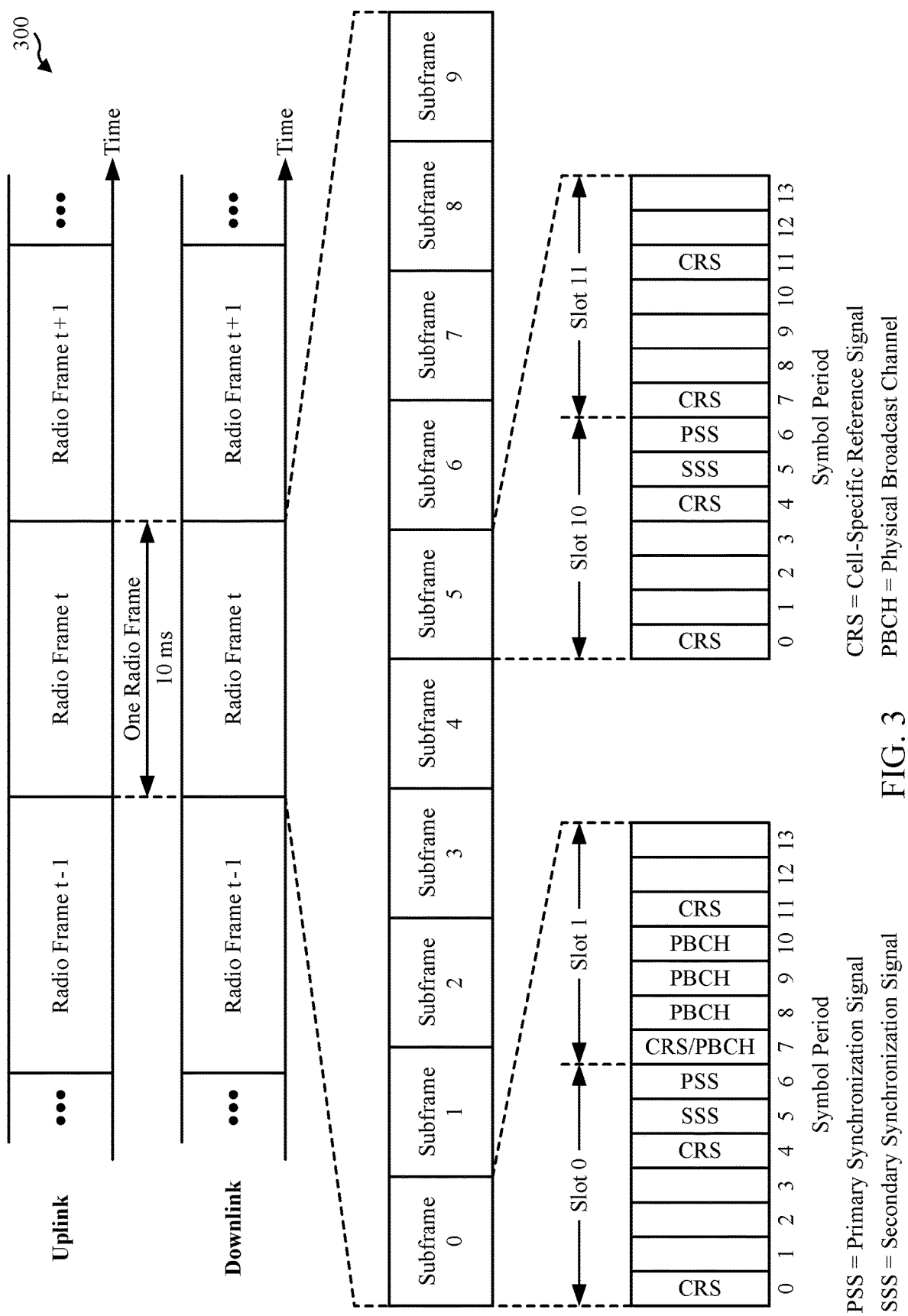
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Example Codebook and Feedback Design

Figure 4:
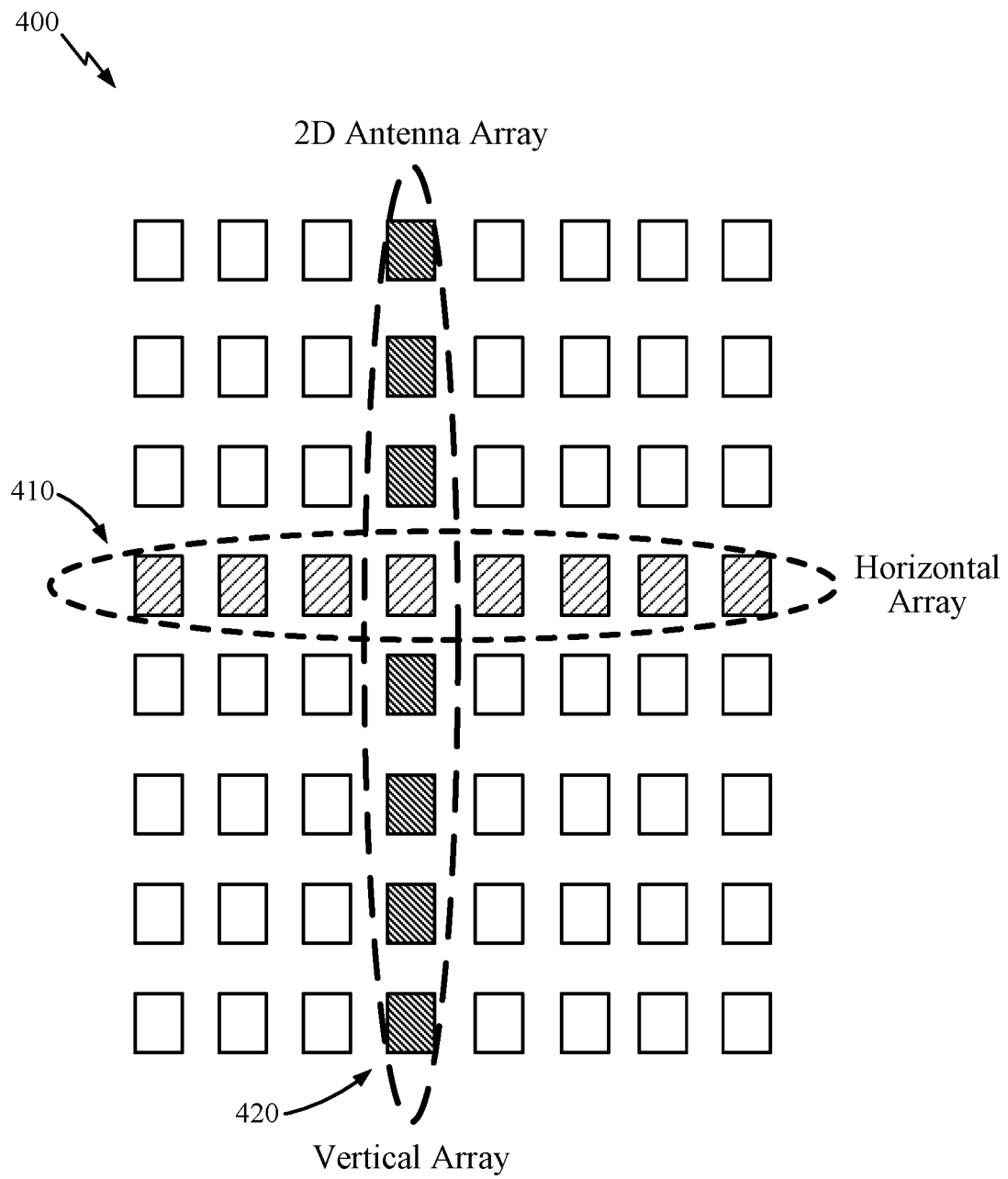
FIG. 4 illustrates an example of an antenna array that may be used for high dimension MIMO, according to aspects of the present disclosure.

In certain systems, higher order multiple-input multiple-output (MIMO) systems (as well as "lower order" 2D MIMO systems), have been discussed to enhance the peak data rate. As an example, in a 2D antenna array system with 64 antennas, it is possible to deploy a grid of 8×8 antennas on a 2D plane, as shown in FIG. 4. In this case, horizontal beamforming as well as vertical beamforming may used to exploit beamforming/SDMA gain both in azimuth and elevation.

Figure 8:
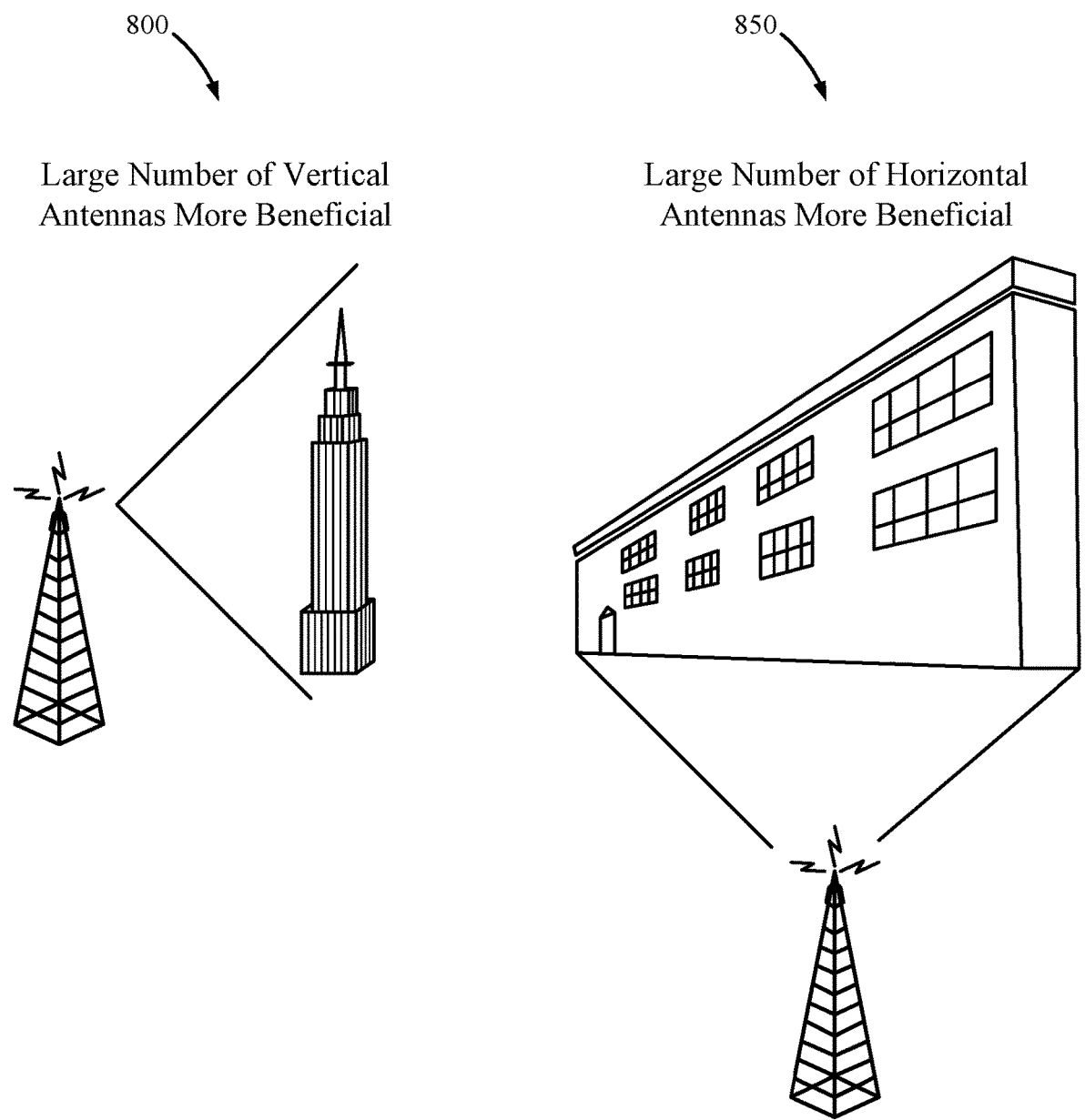
FIG. 8 illustrates an example of antenna re-configuration, according to aspects of the present disclosure.

Current standards (e.g., current versions of LTE) support 8 antennas at the eNB, deployed in one dimension only. This allows spatial division multiple access (SDMA) or single user MIMO (SU-MIMO) in a single (e.g., horizontal) direction. Further inclusion of antennas in a different direction (e.g., vertical elevation), however, would allow beamforming also in the vertical plane (e.g. to support different floors in a high rise building as shown in FIG. 8).

However, one issue with such a system (e.g., as large as the 8×8 array noted above) is the large amount of signalling and processing overhead due to: large reference signal (RS) overhead, large precoding matrix calculation complexity, and large feedback overhead. Aspects of the present disclosure, however, provide techniques that may help address these issues.

As an example, in some cases, reduced virtual beam selection may be utilized. In an N antenna example, ideally, the base station will need to transmit from N distinct RS ports to fully utilize the antenna gain. To reduce the overhead and complexity associated with RS, as well as feedback and precoding matrix selection, physical to virtual antenna mapping to reduce the required RS ports may be utilized (e.g., to map from N physical antennas to K virtual antennas).

With one example of N=64, K=8, there are various options for such mapping from the 64 physical antennas to 8 virtual antennas. One option is to apply separate virtual antenna mapping in horizontal and vertical dimensions. For example, an 8 to 2 mapping may be applied in the vertical dimension, while an 8 to 4 mapping may be applied in the horizontal dimension, resulting in a 64 to 8 antenna port down selection.

Another option is to apply joint virtual antenna mapping in both directions. This option will jointly consider all 64 antennas and apply an antenna mapping, for example, from 64 to 8. As still another option, a mapping may be based on precoding vector mapping or continuous phase mapping (e.g., TDD case based on reciprocity).

The RS signal transmitted to a UE, feedback from the UE, as well as a precoding matrix application, may be based on the K virtual antennas, rather than the N physical antennas.

In some cases, beam scanning may be employed, with CSI reporting periodic in time and utilizing down selection (e.g., with only some antenna ports and/or frequencies used at any given time). In some cases, the down selection may reduce overhead, but may also restrict the beam forming directions of the virtual beams. To overcome this limitation, periodic scanning of the virtual antennas may be utilized.

In some cases, the mapping from physical antenna to virtual antenna may periodically change to beamform in different directions in both azimuth and elevation. This approach (described below with reference to FIG. 5) may allow better granularity in beamforming directions over time. An eNB may signal the periodicity of such an update to UE. The CSI reporting may be mapped to the periodicity of the beam scanning periodicity. At any given time, the UE monitors K virtual antenna ports and report CSI based on the K virtual antennas.

After the virtual antenna mapping changes after one scanning period, the UE reports the CSI for a new set of K virtual antenna ports. For slow varying channels, this periodic scanning may allow for improved channel sounding and refined beam selection. In some cases, the eNB can decide on the best beam forming direction based on multiple reports (over multiple scanning periods).

In some cases, the number of virtual antenna ports and update periodicity may be adaptively configured by the eNB and signalled to UE (e.g., via radio resource control—RRC signalling). This can also be done in a UE transparent manner, as will be described below.

As another option, an eNB can configure a UE for dual CSI reporting in different subframes. In this case, the beam selection/virtual antenna selection may be tied to the subframe types. With this approach, the eNB may have the UE feedback the channel without explicitly informing the UE about the virtual antennas used.

For data transmissions, the eNB may select the best beamforming direction based on the beam scanning and CSI reporting. In some cases, transmission can be based on DM-RS, so eNB beamforming selection may be transparent to UE.

Figure 5:
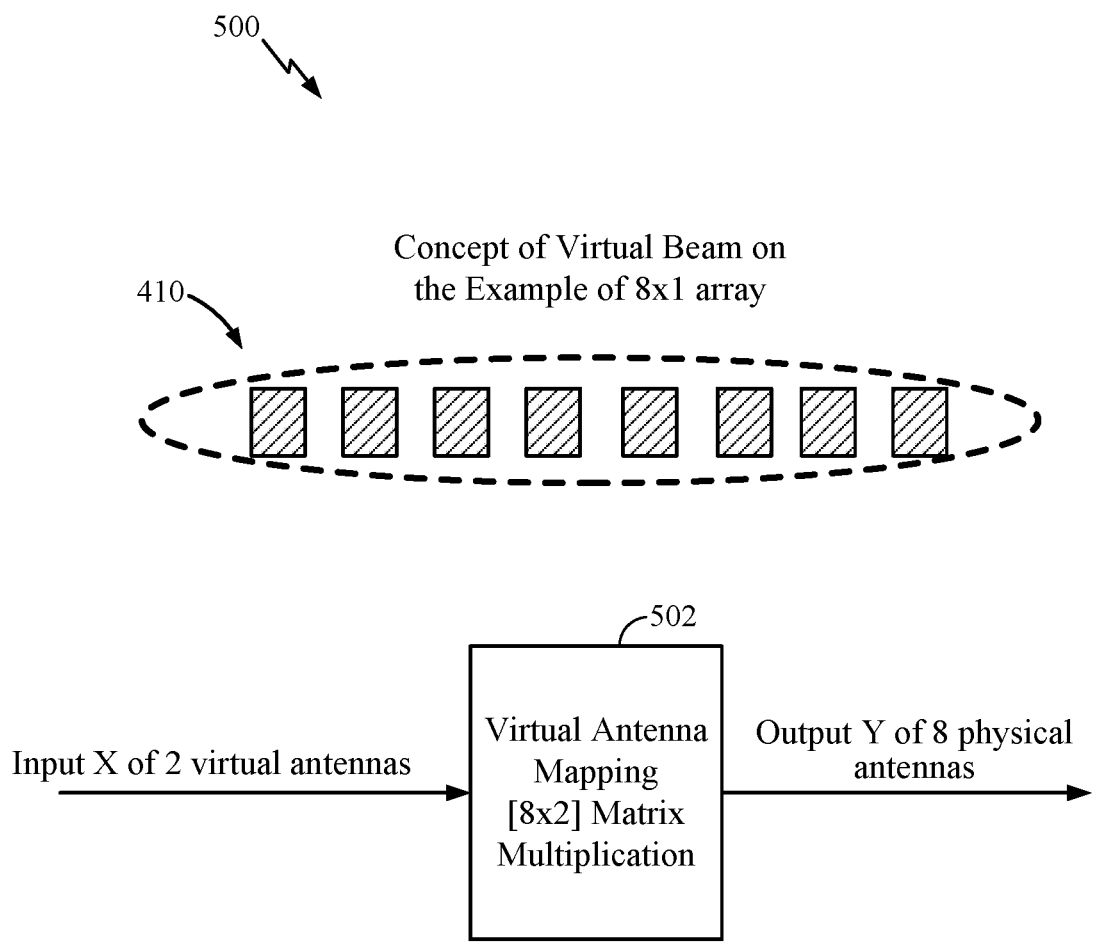
FIG. 5 illustrates an example virtual antenna mapping, according to aspects of the present disclosure.

FIG. 4 illustrates an example 2D Antenna Array, which may be used to describe examples of virtual antenna mapping and cycling, in accordance with aspects of the present disclosure. As illustrated, in this case, the 2D array may be partitioned in single dimensioned arrays: e.g., horizontal array 410 and vertical array 420. As shown in FIG. 5, for horizontal array 410, a mapping 502 may be applied to map input of 2 virtual antennas to outputs of 8 physical antennas.

Figure 6:
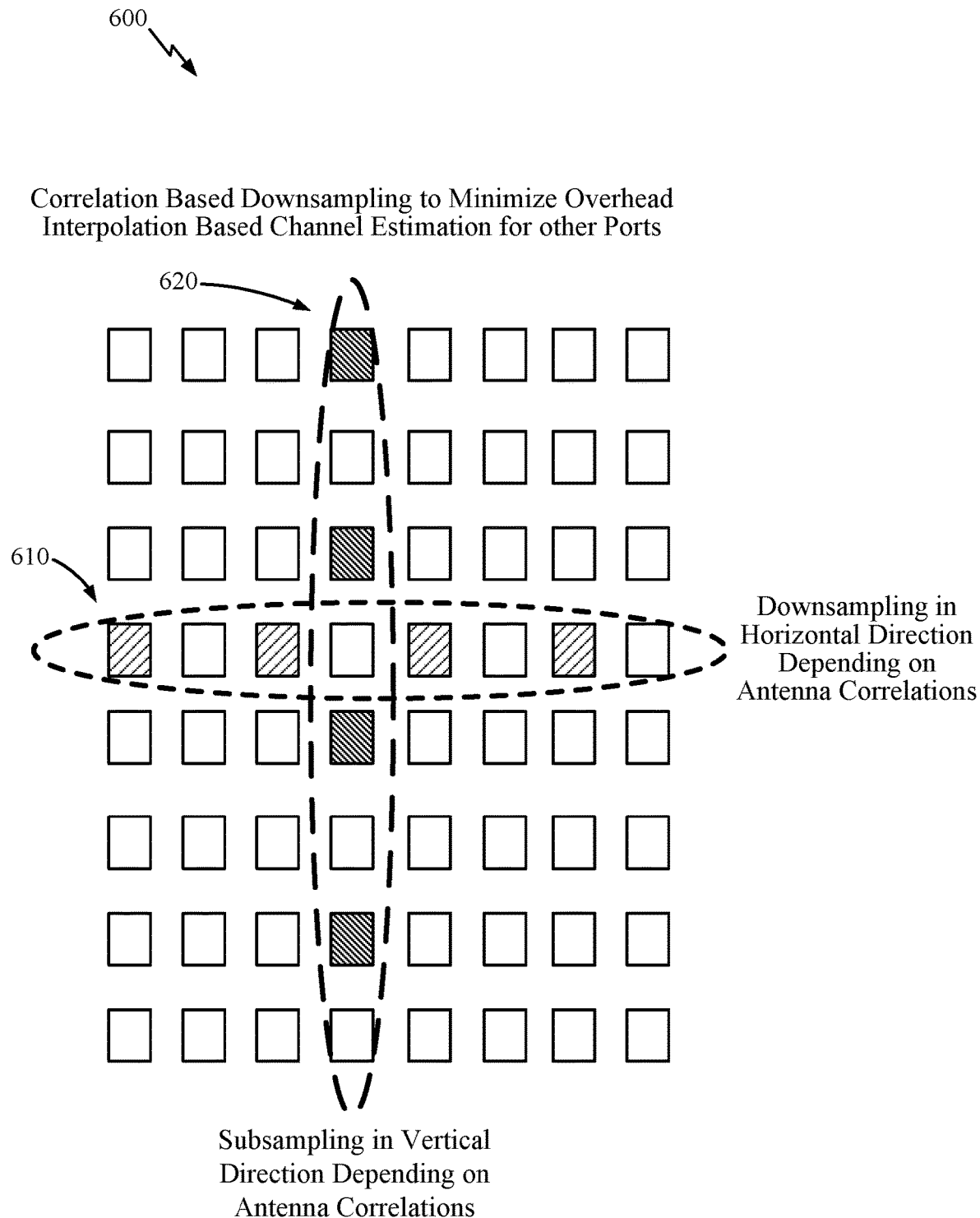
FIG. 6 illustrates an example of down sampling, according to aspects of the present disclosure.

Vertical and horizontal antenna mapping and cycling may involve spatial correlation based down sampling, as illustrated in FIG. 6. As shown, a horizontal array 610 may include only some antennas in a horizontal stripe, while a vertical array 620 may include only some antennas in a vertical stripe. According to this approach, depending on the antenna spacing and the angular spread at the eNB, the eNB can configure different spatial sampling frequency (e.g., to reduce the required RS ports to 1 or 2 within spatial coherence). The down sampling rate can also be different in horizontal and vertical directions, for example, if the antenna spacing and spatial correlation is different in the two directions. In this manner, down sampled sounding may occur in two dimensions (e.g., vertical and horizontal).

Virtual antenna cycling may also be done in frequency. Regarding reducing overhead, given that the subband size is typically defined in the order of 4-8 RBs for a 5-20 MHz system, various options exist. Within each subband, each PRB contains a different virtual antenna port, and can have different beamforming. Across subbands, the same sets of antenna ports and beamforming may be repeated. The subband size can be tied with system bandwidth or fixed (or even configurable based on the physical antennas and the deployment scenario). This may be similar to cycling in time, but now in frequency.

Figure 7:
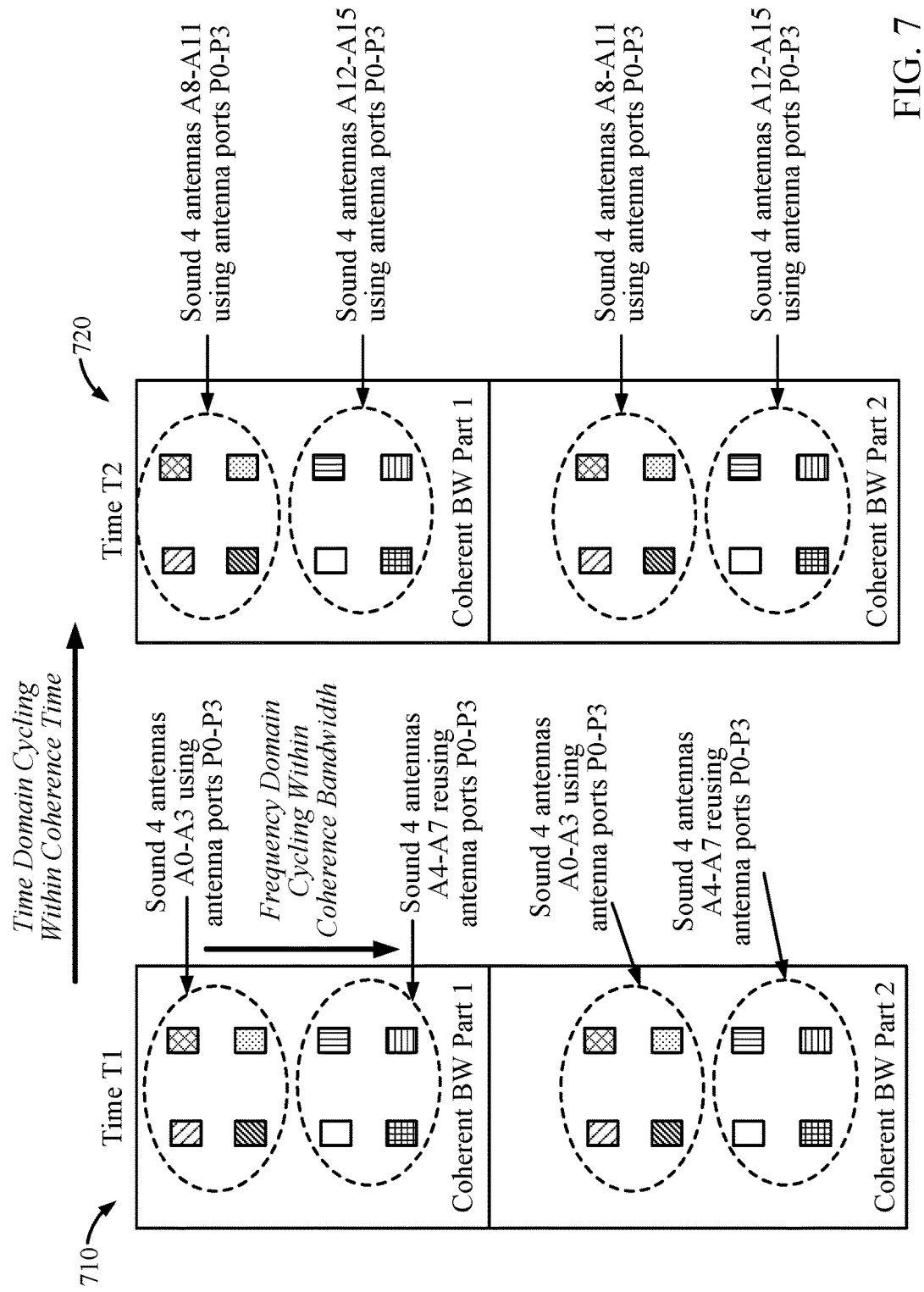
FIG. 7 illustrates an example of time/frequency domain cycling, according to aspects of the present disclosure.

Cycling through frequency may make sense if the coherence bandwidth is large enough. Within coherence bandwidth, the number of antenna ports may be limited such that one antenna port is present only once per coherence bandwidth. This is illustrated in FIG. 7, which shows different mappings 710 and 720, for different times T1 and T2, respectively.

As shown, according to one option, antenna ports may be equally distributed to span physical or virtual antennas within each of the coherence bandwidth (in the illustrated example, to coherent bandwidth parts BW1 and BW2 are shown). As another option, similar to the concept of distributed CEG in the wideband width, antenna ports may be distributed such that all antenna ports are sounded uniformly across the bandwidth.

Similarly, for time domain cycling, antenna ports can cycle through virtual or physical antennas in time.

The frequency cycling and time cycling described above may, of course, be used jointly. In addition, Code Domain Reuse may also be utilized for reuse of RS ports, which may help address reference signal overhead issues. For example, by using a Walsh cover within the coherence time or bandwidth for a set of RS tones. This may allow multiplexing more RS ports on the same physical resources.

In some cases, spatial interpolation may also be utilized, so measurements may be filled in by interpolation for RS ports not actually transmitted (e.g., as illustrated in FIG. 6). Spatial sampling may be applied in both horizontal and vertical direction (e.g., by selecting a center row or center column from the antenna array for RS transmission for feedback purpose). Interpolation may be based on array geometry and feedback from the UE (e.g., horizontal array and vertical array with correlated antennas, e.g., lambda/2).

Current CSI reporting structures may already allow dual CSI reporting and such structures may be used to allow for vertical and horizontal CSI reporting.

Various codebook designs are also available. For example, one option is to define a new "dual codebook" structure in which horizontal and vertical components are decoupled. For example, again considering an 8×8 array of 64 antennas, one horizontal stripe of 8 antennas may be used to derive the horizontal beamforming and one vertical stripe of 8 antennas for the vertical beamforming. In this case, the UE could feed back one horizontal precoding matrix indicator (PMI) and one vertical PMI, respectively, and the eNB would combine these two reports to come up with the beamforming using the full antenna array.

Another option is for joint codebook design for 2D. The precoding code book may be jointly designed to better span the 2D space. Still another option is for a code book design for vertical array and code book design for horizontal array can be different to account for different angular spread and possible different antenna spacing in two dimensions. This may be handled by code book restriction and use a general code book for both, which may allow service of users distributed in different manners horizontally and vertically (e.g., in a high-rise building, users may be distributed in a relatively narrow horizontal dimension, but a long vertical dimension). An adaptive code book design (check) may also be used. For the example of 8×8 antennas, we can have a precoding matrix design for 8 antennas in horizontal and vertical dimensions separately.

Various feedback options are also available. For example, a UE may feedback vertical and horizontal dimensions separately (e.g., Define two sets of reporting for Vertical RI, CQI, PMI and horizontal RI, CQI and PMI). This approach may assume intelligent eNB implementation to jointly process the two dimensional feedbacks to find out the right RI, CQI, PMI for joint transmissions.

Another option is for a UE to feed back vertical and horizontal dimensions jointly (e.g., Joint RI, joint CQI, and joint PMI selection). This may require relatively exact knowledge from the UE about the periodicity, cycling of virtual antenna arrays, and implicit eNB implementation assumption for the joint PMI, as well as assumed antenna array dimensions.

Various options may also be used for rank determination and reporting. If a UE reports rank 1 on both directions, then the eNB may form the beam jointly from both directions and obtain maximum beam forming gain. This may be done by applying the vertical and horizontal precodings to the array elements in two directions. Feedback with R=1, two PMI and one joint CQI assuming pin-pointing at eNB. This can be a default mode for high order 2D MIMO systems, the other dimensions can be used for SDMA of other users, all with rank 1 feedback. This may significantly simplify precoding vector selection as well as feedback overhead.

For rank reporting with rank greater than 1 (R>1), other approaches may be used. For example, in general, if UE feedback rank K1 for horizontal array and K2 for vertical array, the degrees of freedom in the 2D plane is K1*K2, but the CQI and PMI determination will be more involved.

It is also possible to extend the current LTE design to R>8, so that CSI-RS, DM-RS needs to be designed to capture R>8 case.

In this manner, reporting timelines may be dependent on the MIMO dimensions. For example, for high dimensional MIMO, if the calculation of the feedback is too complex, we can extend the feedback time line to beyond 4 ms. One option for MIMO dimension dependent CSI feedback time line is as follows. For number of Tx antennas less than or equal to 8, 4 ms reporting time may be used as in Rel 10. For number of Tx antenna larger than 8, an extended reporting time line (e.g., >4 ms) may be used.

Further Reductions in feedback may also be achieved in various manners. For example, joint coding for feedback (e.g., joint coding of CSI from horizontal direction and vertical direction), differential feedback (e.g., feedback horizontal direction as full feedback, then feed back the differential CQI for the vertical direction).

Adaptive antenna reconfiguration scenarios are also possible. As different deployment scenarios require different accuracy in horizontal or vertical beam forming, it is desirable to be able to adapt antenna configurations. For example, as illustrated in FIG. 8, in a high-rise scenario 800, more resolution in the vertical dimension may be beneficial. On the other hand, for a low-rise complex scenario 850, more resolution in the horizontal dimension may be beneficial.

In some cases, an eNB may start with the default 8×8 physical antenna configuration, eNB can use 2×8 or 8×2 antenna arrays to have the better trade off between RS overhead, feedback complexity and beamforming gain. Of course, the 2×8 and 8×2 arrays can be formed by using all the 8×8 antennas, where the 8⇒2 conversion is done by virtual antenna mapping. eNB may signal the UE about the antenna configurations used so that UE can appropriately calculate feedback.

Figure 9:
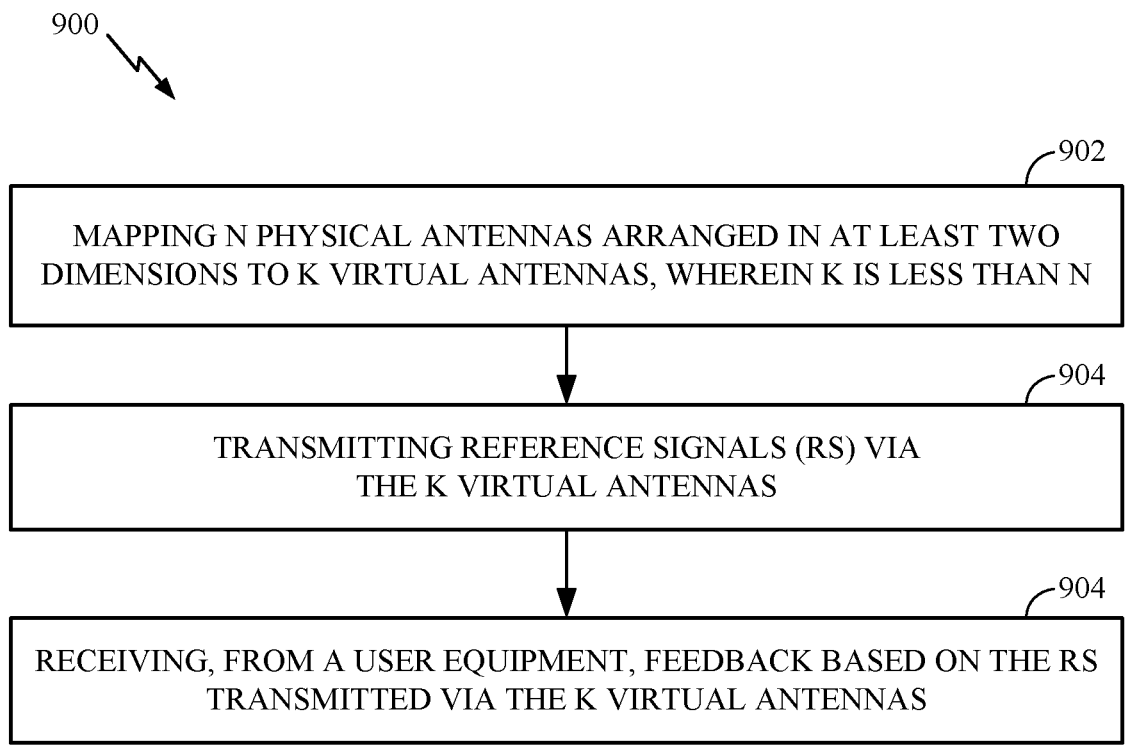
FIG. 9 illustrates example operations that may be performed by a base station, according to aspects of the present disclosure.

FIG. 9 illustrates example operations 900 that may be performed by a base station having a multi-dimensional array of antennas.

The operations 900 begin, at 902, by mapping N physical antennas arranged in at least two dimensions to K virtual antennas, wherein K is less than N. At 904, the base station transmits reference signals (RS) via the K virtual antennas. At 906, the base station receives, from a user equipment, feedback based on the RS transmitted on the K virtual antennas.

Figure 10:
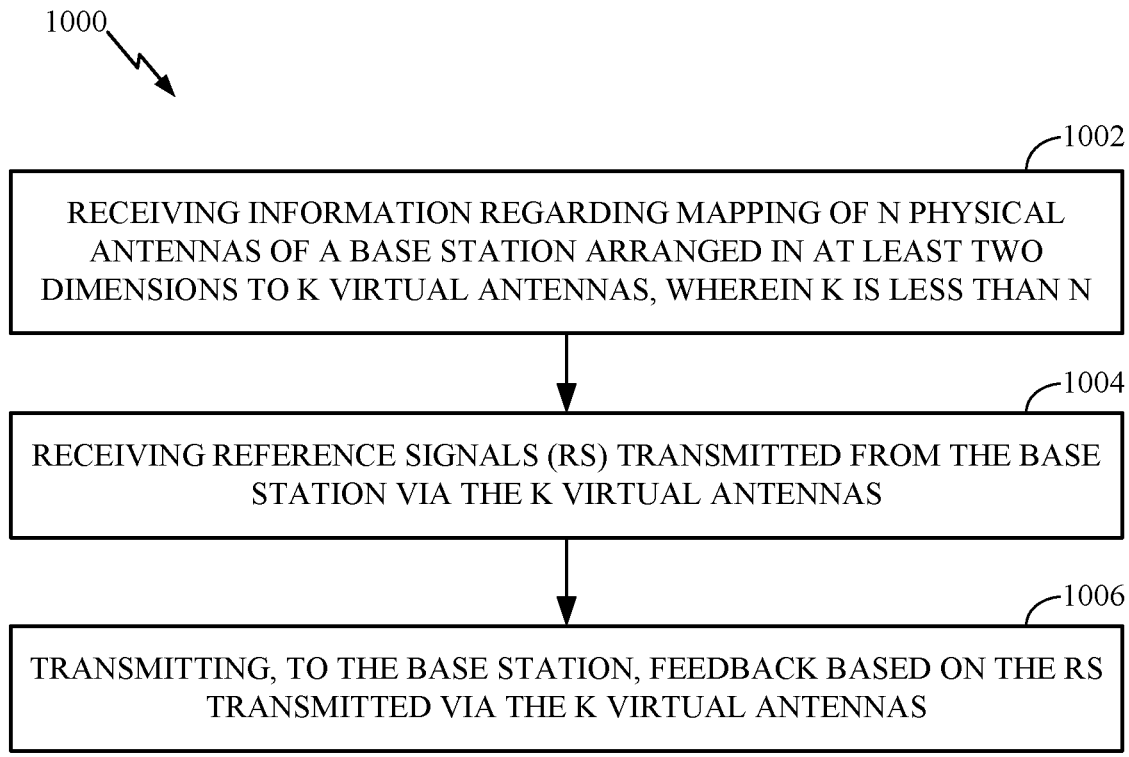
FIG. 10 illustrates example operations that may be performed by a user equipment (UE), according to aspects of the present disclosure.

FIG. 10 illustrates example operations 1000 that may be performed by a user equipment (UE). The operations 1000 may be considered complementary to those shown in FIG. 9.

The operations 1000 begin, at 1002, by receiving information regarding mapping of N physical antennas of a base station arranged in at least two dimensions to K virtual antennas, wherein K is less than N. At 1004, the UE receives reference signals (RS) transmitted from the base station via the K virtual antennas. At 1006, the UE transmits, to the base station, feedback based on the RS.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications by a base station, comprising:
    mapping N physical antennas arranged in at least two dimensions to K virtual antennas, wherein K is less than N, and wherein the mapping comprises spatial sampling in both vertical and horizontal directions;
    transmitting reference signals (RS) via the K virtual antennas; and
    receiving, from a user equipment (UE), feedback based on the RS transmitted on the K virtual antennas, wherein the feedback is received from the UE in one of a plurality of different types of subframes, and wherein a selected virtual antenna is indicated by a subframe type in which the feedback is received and is used for communications with the UE.

2. The method of claim 1, wherein the feedback comprises vertical feedback corresponding to a vertical dimension and horizontal feedback corresponding to a horizontal dimension, and wherein the vertical feedback and horizontal feedback are received from the UE separately.

3. The method of claim 1, wherein the feedback comprises vertical feedback corresponding to a vertical dimension and horizontal feedback corresponding to a horizontal dimension, and wherein the vertical feedback and horizontal feedback is received from the UE jointly.

4. The method of claim 1, wherein the feedback comprises jointly coded horizontal and vertical feedback.

5. The method of claim 1, wherein the feedback comprises feedback in a first dimension received as a full feedback report and feedback in a second dimension received as a differential report relative to the first dimension.

6. A method for wireless communications by a user equipment (UE), comprising:
    receiving information regarding mapping of N physical antennas of a base station arranged in at least two dimensions to K virtual antennas, wherein K is less than N;
    receiving reference signals (RS) transmitted from the base station via the K virtual antennas; and
    transmitting, to the base station, feedback based on the RS in one of a plurality of types of subframes, wherein a selected virtual antenna is indicated by a subframe type in which the feedback is transmitted and is for use in communicating with the UE.

7. The method of claim 6, wherein the feedback comprises vertical feedback corresponding to a vertical dimension and horizontal feedback corresponding to a horizontal dimension, and wherein the vertical feedback and horizontal feedback are transmitted to the base station separately.

8. The method of claim 6, wherein the feedback comprises vertical feedback corresponding to a vertical dimension and horizontal feedback corresponding to a horizontal dimension, and wherein the vertical feedback and horizontal feedback is transmitted to the base station jointly.

9. The method of claim 6, wherein the feedback comprises jointly coded horizontal and vertical feedback.

10. The method of claim 6, wherein the feedback comprises feedback in a first dimension transmitted as a full feedback report and feedback in a second dimension transmitted as a differential report relative to the first dimension.

11. An apparatus for wireless communications by a base station, comprising:
    a memory; and
    at least one processor coupled to the memory and configured to:
        map N physical antennas arranged in at least two dimensions to K virtual antennas, wherein K is less than N, and wherein the mapping comprises spatial sampling in both vertical and horizontal directions;
        transmit reference signals (RS) via the K virtual antennas; and
        receive, from a user equipment (UE), feedback based on the RS transmitted on the K virtual antennas, wherein the feedback is received from the UE in one of a plurality of different types of subframes, and wherein a selected virtual antenna is indicated by a subframe type in which the feedback is received and is used for communications with the UE.

12. The apparatus of claim 11, wherein the feedback comprises vertical feedback corresponding to a vertical dimension and horizontal feedback corresponding to a horizontal dimension, and wherein the vertical feedback and horizontal feedback are received from the UE separately.

13. The apparatus of claim 11, wherein the feedback comprises vertical feedback corresponding to a vertical dimension and horizontal feedback corresponding to a horizontal dimension, and wherein the vertical feedback and horizontal feedback is received from the UE jointly.

14. An apparatus for wireless communications by a user equipment (UE), comprising:
    a memory; and
    at least one processor coupled to the memory and configured to:
        receive information regarding mapping of N physical antennas of a base station arranged in at least two dimensions to K virtual antennas, wherein K is less than N;
        receive reference signals (RS) transmitted from the base station via the K virtual antennas; and transmit, to the base station, feedback based on the RS in one of a plurality of types of subframes, wherein a selected virtual antenna is indicated by a subframe type in which the feedback is transmitted and is for use in communicating with the UE.

15. The apparatus of claim 14, wherein the feedback comprises vertical feedback corresponding to a vertical dimension and horizontal feedback corresponding to a horizontal dimension, and wherein the vertical feedback and horizontal feedback are transmitted to the base station separately.

16. The apparatus of claim 14, wherein the feedback comprises vertical feedback corresponding to a vertical dimension and horizontal feedback corresponding to a horizontal dimension, and wherein the vertical feedback and horizontal feedback is transmitted to the base station jointly.

* * * * *